(12) United States Patent
Pradel

(10) Patent No.: US 6,884,846 B2
(45) Date of Patent: *Apr. 26, 2005

(54) COMPOSITION BASED ON ISOTACTIC POLYPROPYLENE OBTAINED BY METALLOCENE CATALYSIS AND ON GRAFTED ISOTACTIC POLYPROPYLENE OBTAINED BY ZIEGLER-NATTA CATALYSIS

(75) Inventor: Jean-Laurent Pradel, Bernay (FR)

(73) Assignee: Atofina S.A. (FR)

( * ) Notice: Subject to any disclaimer, the term of this patent is extended or adjusted under 35 U.S.C. 154(b) by 76 days.

This patent is subject to a terminal disclaimer.

(21) Appl. No.: 10/268,916

(22) Filed: Oct. 11, 2002

(65) Prior Publication Data

US 2003/0092844 A1 May 15, 2003

(30) Foreign Application Priority Data

Oct. 11, 2001 (FR) .............................................. 01 13107

(51) Int. Cl.⁷ ...................... C08F 255/00; C08L 23/10; C08L 51/00; B32B 27/32
(52) U.S. Cl. ...................... 525/191; 525/207; 525/221; 525/232; 525/240
(58) Field of Search ................. 525/191, 207, 525/221, 232, 240

(56) References Cited

U.S. PATENT DOCUMENTS

| | | |
|---|---|---|
| 5,235,149 A | 8/1993 | Boehrer |
| 5,561,092 A | 10/1996 | Ewen et al. |
| 5,789,502 A | 8/1998 | Shamshoum et al. |
| 5,968,854 A | 10/1999 | Akopian et al. |
| 6,214,949 B1 | 4/2001 | Reddy et al. |
| 6,750,288 B2 * | 6/2004 | Pradel ...................... 525/100 |

FOREIGN PATENT DOCUMENTS

| | | |
|---|---|---|
| EP | 0 581 754 A1 | 2/1994 |
| EP | 0 658 139 B1 | 5/1996 |
| EP | 0 689 505 B1 | 10/1997 |
| EP | 0 802 206 A2 | 10/1997 |
| EP | 0 849 286 A1 | 6/1998 |
| EP | 0 856 525 A1 | 8/1998 |

* cited by examiner

Primary Examiner—Nathan M. Nutter
(74) Attorney, Agent, or Firm—Hunton & Williams LLP

(57) ABSTRACT

The present invention relates to a composition comprising isotactic polypropylene homo- or copolymer obtained by metallocene catalysis (A), abbreviated to miPP, and isotactic polypropylene homo- or copolymer obtained by Ziegler-Natta catalysis (B), abbreviated to zniPP, and grafted. It also relates to a coextrusion tie comprising such a composition.

It also relates to a multilayer structure comprising a layer (L) comprising the preceding tie and, directly attached to this layer:

a nitrogen-comprising or oxygen-comprising polar layer (J), such as a layer of polyamide resin, of saponified ethylene/vinyl acetate copolymer (EVOH) or of polyester;

a layer (J) of an inorganic oxide deposited on a polymer, such as polyethylene (PE), poly(ethylene terephthalate) (PET) or EVOH; or a metal or metalloplastic layer (J).

11 Claims, No Drawings

COMPOSITION BASED ON ISOTACTIC POLYPROPYLENE OBTAINED BY METALLOCENE CATALYSIS AND ON GRAFTED ISOTACTIC POLYPROPYLENE OBTAINED BY ZIEGLER-NATTA CATALYSIS

BACKGROUND OF THE INVENTION

1. Field of the Invention

The present invention relates to a composition comprising an isotactic polypropylene obtained by metallocene catalysis and an isotactic polypropylene obtained by Ziegler-Natta catalysis which is itself grated. This composition is of use as coextrustion tie.

The coextrusion tie comprises grafted isotactic polypropylene obtained by Ziegler-Natta catalysis, diluted in isotactic polypropylene obtained by metallocene catalysis and optionally diluted in at least one polyolefin (E) or in at least one polymer with an elastomeric nature (D) or in at least one blend of (E) and (D).

This coextrusion tie is of use, for example, in the manufacture of multilayer materials for packaging. Mention may be made of materials comprising a film of polyamide (PA) homo- or copolymer and a film of polypropylene (PP) homo- or copolymer, it being possible for the polypropylene film to be laminated onto the polyamide film or coextruded with the polyamide. The coextrusion tie is positioned between the polypropylene film and the polyamide film for good adhesion of the PA and of the PP. These multilayer materials can be three-layer structures PP/tie/EVOH or five-layer structures PP/tie/EVOH/tie/PP in which EVOH denotes a copolymer of ethylene and of vinyl alcohol or a partially or completely saponified ethylene/vinyl acetate (EVA) copolymer.

2. Description of the Related Art

Polypropylene is described in Kirk-Othmer, Encyclopaedia of Chemical Technology, $4^{th}$ edition, Vol. 17, pages 784–819, John Wiley & Sons, 1996. Virtually all polypropylene sold is composed essentially of isotactic polypropylene obtained by Ziegler-Natta catalysis possibly containing a small amount of atactic polypropylene.

U.S. Pat. No. 5,235,149 discloses packagings closed by caps composed of an aluminium sheet, of a tie layer and of a polypropylene layer. The tie layer of the cap is composed of various polymers grafted with acrylic acid or maleic anhydride; the polymers can be chosen from polyethylene, polypropylene, copolymers of ethylene and of vinyl acetate and copolymers of ethylene and of methyl acrylate.

Patent DE 19 535 915 A discloses a grafted polypropylene block copolymer for adhesively bonding polypropylene films to metal sheets.

Patent EP 689 505 discloses structures similar to those disclosed in the above patent but which are used to prepare food packagings.

Patent EP 658 139 discloses structures similar to those disclosed in the preceding patent but the tie is a grafted random polypropylene copolymer comprising from 1 to 10% of comonomer, the Mw/Mn ratio is between 2 and 10 and the MFI (Melt Flow Index) is between 1 and 20 g/10 min (at 230° C. under 2.16 kg).

SUMMARY OF THE INVENTION

It has now been found that the isotactic polypropylene homo- or copolymer obtained by metallocene catalysis, subsequently abbreviated to miPP, makes it possible to obtain tie compositions exhibiting an adhesion comparable to, indeed even better than, that of the ties not comprising miPP. This polypropylene has an applicative advantage in comparison with the polypropylene obtained by Ziegler-Natta catalysis when it is used in coextrusion ties.

A subject-matter of the invention is a composition comprising:

99 to 50% by weight of isotactic polypropylene homo- or copolymer obtained by metallocene catalysis (A);

50 to 1% of a polymer or a blend of polymers, the said polymer or blend of polymers comprising from 50 to 100% by weight of isotactic polypropylene homo- or copolymer obtained by Ziegler-Natta catalysis (B) grafted by a functionalized monomer and from 0 to 50% by weight of polymer (C) chosen from poly(1-butene) homo- or copolymer (C1), polystyrene homo- or copolymer (C2), polyethylene homo- or copolymer (C3) and their blends, the said polymer (C) being itself grafted by a functionalized monomer, the percentages being based on the total of the polymers (A), (B) and (C).

According to an embodiment of the composition, the functionalized monomer is unsaturated.

According to an embodiment of the composition, the functionalized monomer is taken from the group consisting of alkoxysilanes, carboxylic acids and their derivatives, acid chlorides, isocyanates, oxazolines, epoxides, amines and hydroxides.

According to an embodiment of the composition, the functionalized monomer is maleic anhydride.

According to an embodiment of the composition, at least one comonomer of the polyethylene copolymer (C3) is chosen from α-olefins having from 3 to 30 carbon atoms, esters of unsaturated carboxylic acids, vinyl esters of saturated carboxylic acids, unsaturated epoxides, alicyclic glycidyl esters and ethers, unsaturated carboxylic acids, their salts and their anhydrides, and dienes.

According to an embodiment of the composition, the polyethylene (C3) is chosen from LDPE, HDPE, LLDPE, VLDPE, PE obtained by metallocene catalysis, EPR and EPDM elastomers and their blends, ethylene/alkyl (meth) acrylate copolymers, ethylene/alkyl (meth)acrylate/maleic anhydride copolymers and ethylene/vinyl acetate/maleic anhydride copolymers.

According to an embodiment of the composition, the latter is diluted in a polyolefin (E) and/or a polymer with an elastomeric nature (D).

According to an embodiment of the composition, the amount of polyolefin (E) and/or of polymer with an elastomeric nature (D) is advantageously from 20 to 1000 and preferably 30 to 500 parts (by weight) per 10 parts of grafted isotactic polypropylene homo- or copolymer obtained by Ziegler-Natta catalysis (B).

According to an embodiment of the composition, the proportions of polyolefin (E) and of polymer with an elastomeric nature (D) are such that the ratio (D)/(E) is between 0 and 1 and more particularly between 0 and 0.5.

According to an embodiment of the composition, the latter is included in a coextrusion tie.

The invention concerns also the use of the composition above for manufacturing a coextrusion tie.

Another subject-matter of the invention is a multilayer structure comprising a layer (L) comprising a composition as described above and, directly attached to the said layer (L):

a nitrogen-comprising or oxygen-comprising polar layer (J), such as a layer of polyamide resin, of saponified copolymer of ethylene and of vinyl acetate (EVOH) or of polyester; or a layer (J) of an inorganic oxide deposited on a polymer, such as PE, poly(ethylene terephthalate) (PET) or EVOH; or a metal or metalloplastic layer (J).

According to an embodiment of the structure, the latter comprises a polyolefin-based layer (K) directly attached to the layer (L), the layer (L) thus being sandwiched between the said layer (K) and the layer (J).

The composition based on isotactic polypropylene homo- or copolymer obtained by metallocene catalysis (A), abbreviated to miPP, additionally comprises at least one grafted isotactic polypropylene homo- or copolymer obtained by Ziegler-Natta catalysis (B) and optionally a grafted polymer (C), the said polymer (C) being chosen from poly(1-butene) homo- or copolymer (C1), polystyrene homo- or copolymer (C2), polyethylene homo- or copolymer (C3), the blend of (C1) and (C2), the blend of (C1) and (C3), the blend of (C2) and (C3) and the blend of (C1), (C2) and (C3).

DETAILED DESCRIPTION OF PREFERRED EMBODIMENTS

The isotactic polypropylene homo- or copolymer obtained by metallocene catalysis (A), abbreviated to miPP, and the systems which make possible its synthesis are disclosed in the following references of the Applicant Company: U.S. Pat. No. 6,214,949, 5,968,854, EP 856,525, U.S. Pat. No. 5,789,502, EP 849,286, EP 802 206, U.S. Pat. No. 5,561,092 and EP 581 754.

The miPP (A) can, according to the above references, be a copolymer comprising between substantially 0 and 10% by weight of at least one comonomer chosen from ethylene, butene, isobutylene and 4-methylpentene.

As regards the polymer (B), it is an isotactic polypropylene homo- or copolymer obtained by Ziegler-Natta catalysis. Mention may be made, as comonomers, of:

α-olefins, advantageously those having from 3 to 30 carbon atoms. Examples of such α-olefins are the same as for (C3), except that polypropylene is replaced by ethylene in the list below, dienes.

The polymer (B) can also be a copolymer comprising polypropylene blocks.

Mention may be made, as example of polymer (B), of:

polypropylene, blends of polypropylene and of EPDM or of EPR.

Advantageously, the polymer (B), which can be a blend of several polymers, comprises at least 50 mol % and preferably 75 mol % of propylene.

As regards the polymer (C3), it is chosen from polyethylene homo- or copolymers.

Mention may be made, as comonomers, of the following list:

α-olefins, advantageously those having from 3 to 30 carbon atoms. Examples of α-olefins having 3 to 30 carbon atoms comprise propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicosene, 1-docosene, 1-tetracosene, 1-hexacosene, 1-octacosene and 1-triacontene. These α-olefins can be used alone or as a mixture of two or of more than two.

esters of unsaturated carboxylic acids, such as, for example, alkyl (meth)acrylates, it being possible for the alkyls to have up to 24 carbon atoms. Examples of alkyl acrylate or methacrylate are in particular methyl methacrylate, ethyl acrylate, n-butyl acrylate, isobutyl acrylate or 2-ethylhexyl acrylate.

vinyl esters of saturated carboxylic acids, such as, for example, vinyl acetate or propionate.

unsaturated epoxides. Examples of unsaturated epoxides are in particular: aliphatic glycidyl esters and ethers, such as allyl glycidyl ether, vinyl glycidyl ether, glycidyl maleate, glycidyl itaconate, glycidyl acrylate or glycidyl methacrylate, and alicyclic glycidyl esters and ethers, such as 2-cyclohexen-1-yl glycidyl ether, diglycidyl cyclohexene-4,5-dicarboxylate, glycidyl cyclohexene-4-carboxylate, glycidyl 2-methyl-5-norbornene-2-carboxylate and diglycidyl endo-cis-bicyclo[2.2.1]hept-5-ene-2,3-dicarboxylate.

unsaturated carboxylic acids, their salts and their anhydrides. Examples of unsaturated dicarboxylic acid anhydrides are in particular maleic anhydride, itaconic anhydride, citraconic anhydride and tetrahydrophthalic anhydride, dienes, such as, for example, 1,4-hexadiene.

The polymer (C3) can comprise several comonomers.

Advantageously, the polymer (C3), which can be a blend of several polymers, comprises at least 50 mol % and preferably 75 mol % of ethylene. The density of (C3) is between 0.86 and 0.98 g/cm$^3$. The MFI (abbreviation of Melt flow Index, here measured at 190° C. under 2.16 kg) is advantageously between 1 and 1000 g/10 min.

Mention may be made, as example of polymers (C3), of:

low density polyethylene (LDPE)

high density polyethylene (HDPE)

linear low density polyethylene (LLDPE)

very low density polyethylene (VLDPE)

polyethylene obtained by metallocene catalysis, that is to say the polymers obtained by copolymerization of ethylene and of α-olefin, such as propylene, butene, hexene or octene, in the presence of a single-site catalyst generally composed of a zirconium or titanium atom and of two cyclic alkyl molecules bonded to the metal. More specifically, the metallocene catalysts are usually composed of two cyclopentadiene rings bonded to the metal. These catalysts are frequently used with aluminoxanes as cocatalysts or activators, preferably methylaluminoxane (MAO). Hafnium can also be used as metal to which the cyclopentadiene is attached. Other metallocenes can include transition metals from Groups IVA, VA and VIA. Metals from the lanthanide series can also be used.

EPR (ethylene/propylene rubber) elastomers;

EPDM (ethylene/propylene/diene) elastomers;

blends of polyethylene with an EPR or an EPDM;

ethylene/alkyl (meth)acrylate copolymers which can comprise up to 60% by weight of alkyl (meth)acrylate and preferably from 2 to 40%;

ethylene/alkyl (meth)acrylate/maleic anhydride copolymers obtained by copolymerization of the three monomers, the proportions of alkyl (meth)acrylate being identical to those above, the amount of maleic anhydride being from 0 to 10% and preferably from 0.2 to 6% by weight;

ethylene/vinyl acetate/maleic anhydride copolymers obtained by copolymerization of the three monomers, the proportions of vinyl acetate being the same as those of alkyl (meth)acrylate in the above copolymers and the proportions of MAH being the same as those in the above copolymers.

As regards the polymer (C2), it is chosen from polystyrene or styrene copolymers. Mention may be made, among the comonomers, by way of example, of dienes having from 4 to 8 carbon atoms.

As regards the polymer (C1), it is chosen from poly(1-butene) or the copolymers of 1-butene with ethylene or another α-olefin having from 3 to 10 carbon atoms, except the polypropylene (B) already mentioned.

As regards the monomer grafted to the polymer (C) and/or to the polypropylene homo- or copolymer obtained by Ziegler-Natta catalysis (B), it is unsaturated. Moreover, that a monomer said functionalized meaning that it comprises at least one chemical function. Mention may be made, by way of example, of alkoxysilanes, carboxylic acids and their derivatives, acid chlorides, isocyanates, oxazolines, epoxides, amines or hydroxides.

Mention may be made, among alkoxysilanes carrying an unsaturation, of:

vinyltrialkoxysilanes $CH_2=CH-Si(OR)_3$;

allyltrialkoxysilanes $CH_2=CH-CH_2-Si(OR)_3$;

(meth)acryloxyalkyltrialkoxysilanes (or (meth)acrylsilanes)

$CH_2=CR_1-CO-O-Y-Si(OR)_3$ in which: R is an alkyl having from 1 to 5 carbon atoms or an alkoxyl $-R_2OR_3$ in which $R_2$ and $R_3$ are alkyls having at most 5 carbon atoms for the combination of $R_2$ and $R_3$; $R_1$ is a hydrogen or a methyl; Y is an alkylene having from 1 to 5 carbon atoms.

Use is made, for example, of vinylsilanes, such as trimethoxyvinylsilane, triethoxyvinylsilane, tripropoxyvinylsilane, tributoxyvinylsilane, tripentoxyvinylsilane or tris(β-methoxyethoxy)vinylsilane, allylsilanes, such as trimethoxyallylsilane, triethoxyallylsilane, tripropoxyallylsilane, tributoxyallylsilane or tripentoxyallylsilane, or acrylsilanes, such as acryloxymethyltrimethoxysilane, methacryloxymethylmethoxysilane, acryloxyethyltrimethoxysilane, methacryloxymethylmethoxysilane, acryloxyethyltrimethoxysilane, methacryloxyethyltrimethoxysilane, acryloxypropyltrimethoxysilane, methacryloxypropyltrimethoxysilane, acryloxybutyltrimethoxysilane, methacryloxybutylmethoxysilane, acryloxyethyltriethoxysilane, methacryloxyethyltriethoxysilane, methacryloxyethyltripropoxysilane, acryloxypropyltributoxysilane or methacryloxypropyltripentoxysilane.

Use may also be made of mixtures of these products. Use is preferably made of:

vinyltrimethoxysilane (VTMO) $CH_2=CH-Si-(OCH_3)_3$;

vinyltriethoxysilane (VTEO) $CH_2=CH-Si-(OCH_2CH_3)_3$;

vinyltrimethoxyethoxysilane (VTMOEO)
$CH_2=CH-Si-(OCH_2OCH_2OCH_3)_3$; and (3-(methacryloxy)propyl)trimethoxysilane $CH_2=C(CH_3)-C(O)O-(CH_2)_3-Si(OCH_3)_3$ Examples of unsaturated carboxylic acids are those having 2 to 20 carbon atoms, such as acrylic, methacrylic, maleic, fumaric and itaconic acids. The functional derivatives of these acids comprise, for example, the anhydrides, the ester derivatives, the amide derivatives, the imide derivatives and the metal salts (such as the alkali metal salts) of the unsaturated carboxylic acids.

Unsaturated dicarboxylic acids having 4 to 10 carbon atoms and their functional derivatives, particularly their anhydrides, are particularly preferred grafting monomers.

These grafting monomers comprise, for example, maleic, fumaric, itaconic, citraconic, allylsuccinic, cyclohex-4-ene-1,2-dicarboxylic, 4-methylcyclohex-4-ene-1,2-dicarboxylic, bicyclo[2.2.1]hept-5-ene-2,3-dicarboxylic and x-methylbicyclo[2.2.1]hept-5-ene-2,3-dicarboxylic acids and maleic, itaconic, citraconic, allylsuccinic, cyclohex-4-ene-1,2-dicarboxylic, 4-methylenecyclohex-4-ene-1,2-dicarboxylic, bicyclo[2.2.1]hept-5-ene-2,3-dicarboxylic and x-methylbicyclo[2.2.1]hept-5-ene-2,2-dicarboxylic anhydrides.

Examples of other grafting monomer comprise $C_1-C_8$ alkyl esters or glycidyl ester derivatives of unsaturated carboxylic acids, such as methyl acrylate, methyl methacrylate, ethyl acrylate, ethyl methacrylate, butyl acrylate, butyl methacrylate, glycidyl acrylate, glycidyl methacrylate, monoethyl maleate, diethyl maleate, monomethyl fumarate, dimethyl fumarate, monomethyl itaconate and diethyl itaconate; the amide derivatives of unsaturated carboxylic acids, such as acrylamide, methacrylamide, maleic monoamide, maleic diamide, maleic N-monoethylamide, maleic N,N-diethylamide, maleic N-monobutylamide, maleic N,N-dibutylamide, fumaric monoamide, fumaric diamide, fumaric N-monoethylamide, fumaric N,N-diethylamide, fumaric N-monobutylamide and fumaric N,N-dibutylamide; the imide derivatives of unsaturated carboxylic acids, such as maleimide, N-butylmaleimide and N-phenylmaleimide; and metal salts of unsaturated carboxylic acids, such as sodium acrylate, sodium methacrylate, potassium acrylate and potassium methacrylate.

Various known processes can be used to graft a grafting monomer onto the polymer (C) and/or onto the polypropylene homo- or copolymer obtained by Ziegler-Natta catalysis (B).

For example, this can be carried out by heating it at high temperature, approximately 150° C. to approximately 300° C., in the presence or absence of a solvent, with or without a radical initiator.

Appropriate solvents which can be used in this reaction are benzene, toluene, xylene, chlorobenzene or cumene, inter alia.

Appropriate radical initiators which can be used comprise t-butyl hydroperoxide, cumene hydroperoxide, diisopropylbenzene hydroperoxide, di(t-butyl) peroxide, t-butyl cumyl peroxide, dicumyl peroxide, 1,3-bis(t-butylperoxyisopropyl)benzene, acetyl peroxide, benzoyl peroxide, isobutyryl peroxide, bis(3,5,5-trimethylhexanoyl) peroxide and methyl ethyl ketone peroxide.

The polymer (C) and/or the polypropylene homo- or copolymer obtained by Ziegler-Natta catalysis (B) can be dry or melt preblended and can then be grafted in the molten state or in solution in a solvent. They can also be added separately to a device for bringing into contact and blending (for example, an extruder) with the grafting monomer and the radical initiator. Use may be made of the usual mixing and blending devices of the thermoplastics industry.

The amount of grafting monomer can be appropriately chosen but it is preferably from 0.01 to 10%, preferably 0.1 to 5%, with respect to the weight of the composition comprising zniPP (B) and optionally comprising the polymer (C) to be grafted. The amount of grafted monomer is determined by quantitatively determining the succinic functional groups by FTIR spectroscopy.

The grafted isotactic polypropylene obtained by Ziegler-Natta catalysis (B) is manufactured:
either by grafting a blend comprising at least (B) and optionally at least one polymer (C) chosen from (C1), (C2), (C3) and their blend. Advantageously, the proportion of (B) is at least 50% and preferably 70% by weight of the blend to be grafted;

or by grafting the isotactic polypropylene obtained by Ziegler-Natta catalysis (B) and then optionally blending it with at least one polymer (C) itself grafted and chosen from (C1), (C2), (C3) and their blend. In this case, the grafting monomer used to graft the zniPP (B) can be identical to or different from that used to graft the polymer (C).

This grafted isotactic polypropylene obtained by Ziegler-Natta catalysis (B) is then diluted in isotactic polypropylene obtained by metallocene catalysis (A) and optionally in at least one polyolefin (E) or one polymer with an elastomeric nature (D) or in a blend of (E) and (D).

This is because the invention also relates to a coextrusion tie comprising:

isotactic polypropylene obtained by metallocene catalysis (A);

grafted isotactic polypropylene home- or copolymer obtained by Ziegler-Natta catalysis (B) and optionally grafted polymer (C); and at least one polyolefin (E) or at least one polymer with an elastomeric nature (E) or at least one blend of (E) and (D).

The polyolefin (E) can be chosen from polymers (C) and isotactic polypropylene obtained by metallocene catalysis (A).

The polymer (D) is a polymer with an elastomeric nature, that is to say that it can be:

(i) an elastomer in the sense of Standard ASTM D412, meaning that it can be drawn at ambient temperature to two times its width, can be held thus for 5 minutes and can then return to its starting size, to within less than about 10%, when it is released; or (ii) a polymer which does not have exactly the above characteristics but which can be drawn and can return substantially to its starting size.

The MFI of (D) is advantageously between 0.1 and 50 g/10 min.

Mention may be made, as example of polymers (D), of:

EPR (ethylene/propylene rubber) polymers and EPDM (ethylene/propylene/diene) polymers;

polyethylenes obtained by metallocene catalysis and with a density of less than 0.910 g/cm$^3$;

polyethylenes of VLDPE type (very low density);

styrene elastomers, such as SBR (styrene/butadiene rubber) elastomers, styrene/butadiene/styrene (SBS) block copolymers, styrene/ethylene/butene/styrene (SEBS) block copolymers and styrene/isoprene/styrene (SIS) block copolymers;

copolymers of ethylene and of at least one ester of unsaturated carboxylic acid (already defined above for (C3));

copolymers of ethylene and of at least one vinyl ester of saturated carboxylic acid (already defined above for (C3)).

The amount of isotactic polypropylene obtained by metallocene catalysis (A) and optionally of polyolefin (E) and/or of polymer with an elastomeric nature (D) can be from 20 to 1000 and preferably 60 to 500 parts (by weight) per 10 parts of grafted isotactic polypropylene obtained by Ziegler-Natta catalysis (B). Use is advantageously made of the isotactic polypropylene obtained by metallocene catalysis (A) and the polyolefin (E). The preferred proportions are such that the ratio of the amount of polyolefin (E) to the isotactic polypropylene obtained by metallocene catalysis (A) is between 0 and 1 and more particularly between 0 and 0.5.

The tie of the invention can be manufactured by the usual means for thermoplastics by melt blending the various constituents in Buss® twin-screw extruders, mixers or roll mills.

The tie of the invention can also comprise various additives, such as antioxidants, ultraviolet absorbers, antistatic agents, pigments, dyes, nucleating agents, fillers, slip agents, lubricants, flame retardants and antiblocking agents.

As regards the multilayer structure according to the present invention, it comprises a layer (L) comprising the abovedescribed tie and, directly attached to this layer, a layer (J) which can be:

(i) a layer of oxygen-comprising or nitrogen-comprising polar resin, (ii) a layer of an inorganic oxide deposited on a polymer, such as polyethylene (PE), poly(ethylene terephthalate) (PET) or ethylene/vinyl alcohol (EVOH) copolymer, or (iii) a metal or metalloplastic layer.

Examples of polar resins which are preferred in the layer (J) are polyamide resins, a saponified copolymer of ethylene and of vinyl acetate, and polyesters.

More specifically, these polar resins comprise synthetic long-chain polyamides having structural units of the amide group in the main chain, such as PA-6, PA-6,6, PA-6,10, PA-11 and PA-12; a saponified copolymer of ethylene and of vinyl acetate having a degree of saponification of approximately 90 mol % to 100 mol %, obtained by saponifying an ethylene/vinyl acetate copolymer having an ethylene content from approximately 15 mol % to approximately 60 mol %; polyesters, such as poly(ethylene terephthalate), poly (butylene terephthalate) or poly(ethylene naphthenate); and blends of these resins.

The layer of inorganic oxide can, for example, be silica, deposited on a layer of PE, of PET or of EVOH. In this case, the structure according to the invention therefore successively comprises: a tie layer comprising the composition according to the invention attached to an $SiO_2$ (or $SiO_x$) layer, itself deposited on a layer of PE, of PET or of EVOH.

The metal layer can, for example, be a film or a sheet of a metal, such as aluminium, iron, copper, tin and nickel, or an alloy containing at least one of these metals as predominant constituent. The thickness of the film or of the sheet is, for example, from approximately 0.01 to approximately 0.2 mm. It is common practice to degrease the surface of the metal layer before laminating the tie according to the invention thereon. This layer (J) can also be a metalloplastic layer, such as, for example, a sheet of PET covered with aluminium.

It would not be departing from the scope of the invention if the preceding structure were combined with other layers.

The invention also relates to the preceding structure combined with a polyolefin-based layer (K) on the side of the tie layer (L) which has remained free, the tie layer (L) thus making possible the adhesion of the layers (J) and (K) to one another. The structure defined here is of the form Layer (K)/Layer (L)/Layer (J). The polyolefin of the layer (K) can be chosen from the polymers (C) defined above.

These structures are of use in preparing packagings, for example rigid hollow bodies, such as bottles or jars, flexible bags or multilayer films.

The structures according to the invention are, for example, of the following form, with the tie comprising the composition according to the invention:

Layer (K)/Layer (L)/Layer (J)/Layer (L)/Layer (K): PE/tie/EVOH/tie/PE or PP/tie/EVOH/tie/PP or PE/tie/EVOH/tie/PP Layer (K)/Layer (L)/Layer (J): PE/tie/EVOH or PE/tie/PA or PP/tie/PA These structures and these packagings can be manufactured by coextrusion, lamination, extrusion-blow moulding and coating.

The following products were used in carrying out the following tests and comparative tests:

miPP 1: Isotactic polypropylene copolymer obtained by metallocene catalysis, comprising 3.5% of ethylene.
Density=0.900 g/cm$^3$, MFI=7 g/10 min (at 230° C. under 2.16 kg).

miPP 2: Isotactic polypropylene copolymer obtained by metallocene catalysis, comprising 3.5% of ethylene.
Density=0.900 g/cm$^3$, MFI=8 g/10 min (at 230° C. under 2.16 kg).

miPP 3: Isotactic polypropylene copolymer obtained by metallocene catalysis, comprising 5% of ethylene.
Density=0.900 g/cm$^3$, MFI=2.5 g/10 min (at 230° C. under 2.16 kg).

PP 3020 GN3: Random polypropylene copolymer obtained by Ziegler-Natta catalysis (zniPP).
Density=0.900 g/cm$^3$, MVI (Melt Volume Index)=2 cm$^3$/10 min (at 230° C. under 2.16 kg).

PP terpo: Random polypropylene terpolymer.
Density=0.900 g/cm$^3$, MVI=5 cm$^3$/10 min (at 230° C. under 2.16 kg).

MAH: Maleic anhydride.

PPAM2: Polypropylene grafted with maleic anhydride, comprising 2.5% of MAH.
MFI=40 g/10 min (at 190° C. under 325 g).

LLDPE: Linear low density polyethylene.
Density=0.900 g/cm$^3$, MFI=3 g/10 min (at 190° C. under 2.16 kg).

EPR: Ethylene/Propylene Rubber.
Density=0.870 g/cm$^3$, MFI=5 g/10 min (at 190° C. under 2.16 kg).

mPE: Polyethylene obtained by metallocene catalysis.
Density=0.870 g/cm$^3$, MFI=5 g/10 min (at 190° C. under 2.16 kg).

The products are manufactured in a corotating twin-screw extruder of Leistritz® type.

The extruder comprises 8 regions numbered Z1 to Z8, the region Z8 being situated at the end of the extruder where the grafted products exit. The processing is carried out at the usual temperatures known to a person skilled in the art.

The maleic anhydride and the polypropylene to be grafted are introduced into the region Z1 via two separate weight metering devices.

The radical initiator, pure or diluted in an appropriate solvent, is introduced via a metering pump into the region Z2. The temperatures in the regions Z3, Z4 and Z5 are at least sufficient for 99.9% of the radical initiator to react before the region Z6. The initiator used is 2,5-dimethyl-2,5-di(tert-butylperoxy)hexane or DHBP (Luperox® 101). The residues from the radical initiator, the solvent and the unreacted maleic anhydride are degassed under vacuum in the region Z6.

The throughput for extrusion at the outlet of the region Z8 varies, according to the screw rate imposed, between 12 and 15 kg/h. The lace is granulated after cooling.

Cast technology was then used to produce a structure comprising 5 layers, successively and respectively PP/tie/EVOH/tie/PP, in which:

PP denotes a layer of isotactic polypropylene obtained by Ziegler-Natta catalysis (zniPP), tie denotes a layer comprising the composition defined in Table 1 with CP1 to CP4, the comparatives from 1 to 4 and EX1 to EX3, the examples from 1 to 3 according to the invention, and EVOH denotes a layer of ethylene/vinyl alcohol copolymer.

The thicknesses of the successive layers are respectively, in μm: 20/10/10/10/50.

The peel strength between the 10-μm tie layer and the 10-μm EVOH layer, in the direction of the 20-μm PP layer (CASE 1), and between the 10-μm tie layer and the 10-μm EVOH layer, in the direction of the 50-μm PP layer (CASE 2), was subsequently measured.

The peel strength is expressed in N/15 mm at a drawing rate of 200 mm/min at t=0, that is to say immediately after the structure has been prepared, and at t=8, that is to say 8 days after the structure has been prepared. The tie compositions in % by weight, the peel strengths at t=0 and t=8 days, and the standard deviations (σ) at t=0 (σ0) and t=8 days (σ8) are given in Table 2.

TABLE 1

| | Composition of the Tie | | | | | |
|---|---|---|---|---|---|---|
| | (A) | (%) | (E) | (%) | (B) | (%) |
| CP1 | PP 3020GN3 | 74 | LLDPE | 20 | PPAM2 | 6 |
| CP2 | PP 3020GN3 | 74 | EPR | 20 | PPAM2 | 6 |
| CP3 | PP 3020GN3 | 74 | mPE | 20 | PPAM2 | 6 |
| CP4 | PP Terpo | 74 | mPE | 20 | PPAM2 | 6 |
| EX1 | miPP 1 | 74 | mPE | 20 | PPAM2 | 6 |
| EX2 | miPP 2 | 74 | mPE | 20 | PPAM2 | 6 |
| EX3 | miPP 3 | 74 | mPE | 20 | PPAM2 | 6 |

TABLE 2

| | CASE 1 | | | | CASE 2 | | | |
|---|---|---|---|---|---|---|---|---|
| | Peel strength at t = 0 (N/15 mm) | σ0 | Peel strength at t = 8 (N/15 mm) | σ8 | Peel strength at t = 0 (N/15 mm) | σ0 | Peel strength at t = 8 (N/15 mm) | σ8 |
| CP1 | 4.99 | 0.61 | 6.33 | 0.39 | 1.83 | 0.06 | 3.27 | 0.1 |
| CP2 | 5.69 | 0.35 | 7.3 | 0.12 | 2.6 | 0.11 | 4.28 | 0.22 |
| CP3 | 5.71 | 0.62 | 7.3 | 0.4 | 2.76 | 0.15 | 4.20 | 0.33 |
| CP4 | 5.75 | 0.1 | 6.69 | 0.05 | 2.4 | 0.1 | 4.35 | 0.05 |
| EX1 | 5.44 | 0.09 | 6.94 | 0.07 | 2.63 | 0.04 | 4.91 | 0.04 |
| EX2 | 5.6 | 0.13 | 7.02 | 0.12 | 2.73 | 0.07 | 4.87 | 0.14 |
| EX3 | 5.76 | 0.29 | 7.11 | 0.25 | 2.60 | 0.05 | 4.02 | 0.08 |

What is claimed is:

1. A composition comprising:

99 to 50% by weight of isotactic polypropylene homo- or copolymer obtained by metallocene catalysis (A);

50 to 1% of a polymer or a blend of polymers, the polymer or blend of polymers comprising (i) from 50 to 100% by weight of isotactic polypropylene homo- or copolymer obtained by Ziegler-Natta catalysis (B) grafted by a functionalized monomer; and (ii) from 0 to 50% by weight of a polymer (C) comprising a poly(1-butene) homo- or copolymer (C1), a polystyrene homo- or copolymer (C2), or a polyethylene homo- or copolymer (C3) and their blends, said polymer (C) being itself grafted by a functionalized monomer, the percentages being based on the total of the polymers (A), (B) and (C).

2. The composition according to claim 1, wherein the functionalized monomer is unsaturated.

3. The composition according to claim 1, wherein the functionalized monomer is an alkoxysilane, a carboxylic acid or its derivative, an acid chloride, an isocyanate, an oxazoline, an epoxide, an amine or a hydroxide.

4. The composition according to claim 1, wherein the functionalized monomer is maleic anhydride.

5. The composition according to claim 1, wherein at least one comonomer of the polyethylene copolymer (C3) is an α-olefins having from 3 to 30 carbon atoms, an ester of an unsaturated carboxylic acid, a vinyl ester of a saturated carboxylic acid, an unsaturated epoxide, an alicyclic glycidyl ester or ether, an unsaturated carboxylic acid, or its salts or its anhydrides, or a diene.

6. The composition according to claim 1, wherein the polyethylene (C3) is LDPE, HDPE, LLDPE, VLDPE, PE obtained by metallocene catalysis, EPR or an EPDM elastomer or a blend of EPDM elastomers, an ethylene/alkyl (meth)acrylate copolymer, an ethylene/alkyl (meth)acrylate/maleic anhydride copolymer or an ethylene/vinyl acetate/maleic anhydride copolymer.

7. The composition according to claim 1, further comprising a polyolefin (E) and/or a polymer with an elastomeric nature (D) into which said composition is diluted.

8. The composition according to claim 7, in which the amount of polyolefin (E) and/or of polymer with an elastomeric nature (D) is advantageously from 20 to 1000 parts (by weight) per 10 parts of grafted isotactic polypropylene homo- or copolymer obtained by Ziegler-Natta catalysis (B).

9. The composition according to claim 8, wherein the amount of polyolefin (E) and/or of polymer with an elastomeric nature (D) is 30 to 500 parts (by weight) per 10 parts of grafted isotactic polypropylene homo- or copolymer obtained by Ziegler-Natta catalysis (B).

10. The composition according to claim 7, in which the proportions of polyolefin (E) and of polymer with an elastomeric nature (D) are such that the ratio (D)/(E) is between 0 and 1.

11. The composition according to claim 10, in which the proportions of polyolefin (E) and of polymer with an elastomeric nature (D) are such that the ratio (D)/(E) is between 0 and 0.5.

* * * * *